United States Patent
Yee

[15] 3,671,733
[45] June 20, 1972

[54] STEERABLE LAMP SYSTEM FOR MOTOR VEHICLES
[72] Inventor: John W. Yee, Detroit, Mich.
[73] Assignee: General Motors Corporation, Detroit, Mich.
[22] Filed: Jan. 20, 1971
[21] Appl. No.: 108,070

[52] U.S. Cl................................240/8.25, 240/62.5
[51] Int. Cl...............................................B60q 1/12
[58] Field of Search...............240/8.25, 57, 61.9, 62.5, 62.52

[56] References Cited

UNITED STATES PATENTS 2,490,948  12/1949  Coulter.......................240/62.5 X
2,941,118  6/1960  Engelmann.....................240/8.25 X Primary Examiner—John M. Horan
Assistant Examiner—Richard A. Wintercorn
Attorney—J. L. Carpenter, E. J. Biskup and P. D. Sachtjen

[57] ABSTRACT

A steerable lamp system for a motor vehicle wherein a pair of supplemental driving lamps operable through a control linkage connected to the vehicle steering system are rotated in the direction of vehicle travel in response to steering movement. The control linkage includes a motor-powered extensible link electrically coupled to the vehicle turn signal system that pivots the lamps in the direction of a contemplated turn prior to initiation of the actual turning sequence.

3 Claims, 8 Drawing Figures

Patented June 20, 1972

INVENTOR.
John W. Yee
BY
Peter D. Sachtjen
ATTORNEY

Patented June 20, 1972

INVENTOR.
John W. Yee
BY
Peter D. Sachtjen
ATTORNEY

Patented June 20, 1972

INVENTOR.
John W. Yee

BY
Peter D. Sachtjen
ATTORNEY

Patented June 20, 1972

INVENTOR.
John W. Yee
BY
Peter D. Sachtjen
ATTORNEY

STEERABLE LAMP SYSTEM FOR MOTOR VEHICLES

This invention relates to motor vehicle lighting and, in particular, to a steerable lamp system wherein lighting units are operatively connected to the vehicle steering system so as to project illumination in the direction of vehicle travel.

Numerous arrangements have been proposed in the prior art for mechanically connecting motor vehicle lighting units to the steering system so as to position the projected light beams in conjunction with the turning movement of the vehicle thereby continuously establishing an illuminated area in the direction of vehicle travel. Generally, these systems are directly coupled to the steering system and rotate at all times in direct response to turning movement. However, arrangements of this type are not altogether satisfactory in providing increased visibility in that the lamps do not illuminate the lateral area into which the vehicle is being turned in advance of the actual steering movement. Therefore, these systems do little to supplement the conventional lighting system for sharp or right angle turns.

The present invention contemplates an improved steerable lamp system wherein a pair of supplemental driving lamps are initially rotated prior to initiation of the turning movement with subsequent added lamp movement being in response to steering movement. With such an arrangement, the driver is provided with increased lateral visibility during the initial part of the turn. More specifically, the driving lamps are disposed at the front of the vehicle on or near the center plane and are operatively coupled to the vehicle steering mechanism by a control linkage having a motor-powered extensible arm. Under normal driving conditions, the extensible arm is fixed and the positioning of the driving lamps is purely responsive to the steering movement. However, when the driver contemplates a turn and closes the turn signal switch, the motor is energized to extend the arm and effect an initial rotation of the lamp prior to initiating the actual turning sequence. After the turn sequence has been completed and the turn signal switch cancelled, the motor is automatically reversed to restore the lamps to a centered position and return direct control of the system to the steering movement. In this manner, substantially greater lateral illumination is provided during initial stages of actuate turns.

Accordingly, an object of the present invention is to provide a motor vehicle lighting system wherein lighting means pivotally mounted on the vehicle are rotated in the direction of a contemplated turn prior to commencement of the actual turning sequence.

Another object of the present invention is to provide a steerable lamp system for a motor vehicle wherein lighting units are operatively connected to the vehicle steering system by a linkage arrangement which includes extensible means controlled by the vehicle driver for effecting preliminary pivoting of the lighting units in the direction of a contemplated turn.

A further object of the present invention is to provide a steerable lamp system operable through the vehicle steering means and turn signal system for projecting light laterally of the vehicle in the direction contemplated and actual turns wherein supplemental driving lamps are operatively coupled to the steering system by a linkage so as to be directly responsive to steering movement of the vehicle for projecting light in the direction of actual turning, the linkage including a motor-powered extensible arm responsive to energization of the turn signal system for causing preliminary pivoting of the lamp in the direction of a contemplated turn in advance of the actual turning sequence, and for automatically recentering the lamps after completion of the turn.

Still another object of the present invention is to provide a steerable lamp system for a motor vehicle having increased lateral visibility in the direction of vehicle turning wherein a control linkage operatively connected between the vehicle steering system and a pair of pivotally mounted supplemental driving lamps includes an extensible arm coupled to a linear actuator controlled by the vehicle signal system, the arrangement being such that during normal driving the lighting unit is solely responsive to movement of the steering system but, upon energization of the turn signal system the actuator changes the operative length of the linkage and effects preliminary pivoting of the lamp in the direction of a contemplated turn and, upon cancellation of the turn signal system, automatically returns positioning of the lamps to direct control by the steering system.

These and other objects will be apparent to one skilled in the art upon reading the following detailed description, reference being made to the accompanying drawings in which.

Figure 1:
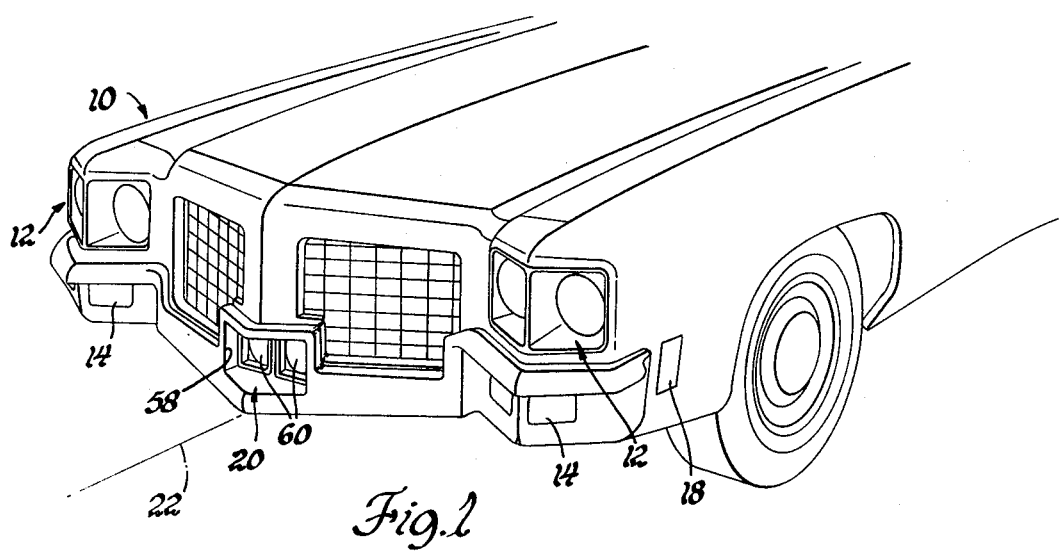
FIG. 1 is a front perspective view of a motor vehicle incorporating a steerable lamp system made in accordance with the present invention.

Referring to FIG. 1, there is shown a motor vehicle 10 having a lighting system including headlamps 12, turn signal lamps 14, side marker lamps 18, and a steerable lamp assembly 20. The aforementioned lamps are symmetrically disposed on opposite sides of the longitudinal vehicle axis 22 for projecting illumination forwardly and laterally of the motor vehicle 10 in a manner prescribed by applicable lighting standards. Thus, the headlamps 12 constitute a major lighting device for providing illumination forwardly of the vehicle during driving conditions of reduced visibility. The turn signal lamps 14 flash in unison with correspondingly located rear lamps to indicate the intention of the vehicle to change direction toward the side on which the lamp is flashing. The side marker lamps 18 are steadily energized with the headlamps to indicate the overall length of the motor vehicle 10. The steerable lamp assembly 20, in a manner hereinafter explained in detail, is used for providing forward illumination in response to vehicle turning movement and increased lateral illumination in the direction of a contemplated turn.

Figure 2:
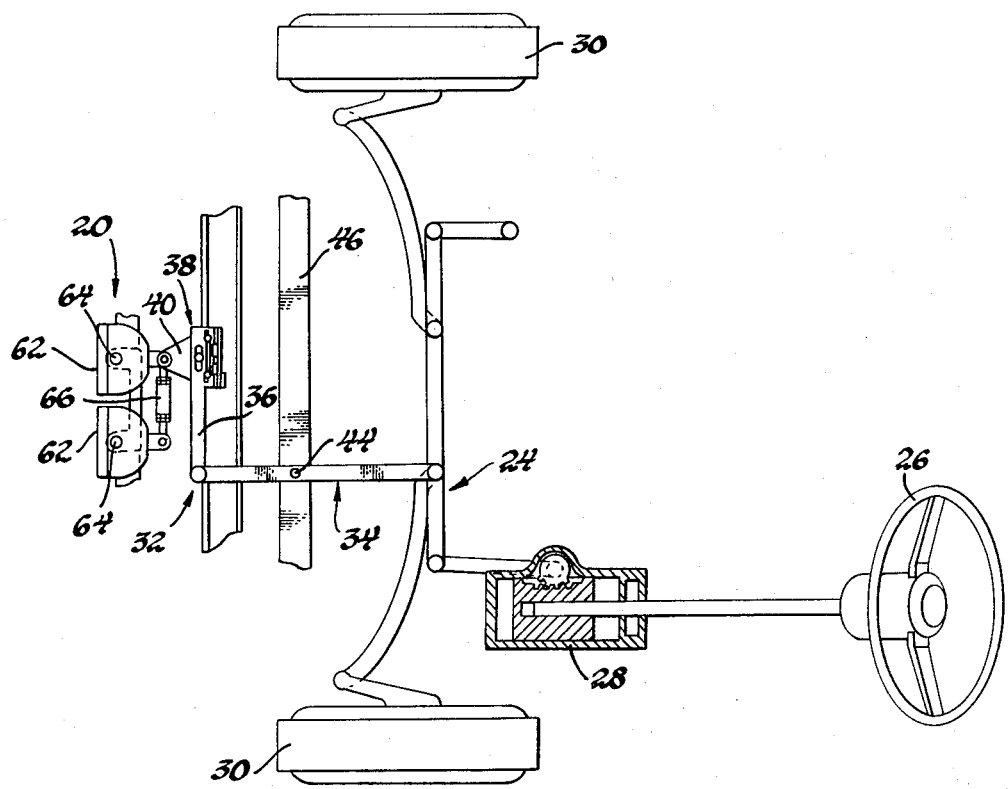
FIG. 2 is a schematic view showing the operative coupling between the vehicle steering system and the steerable lamps.

As shown in FIG. 2, the motor vehicle 10 includes a steering linkage 24, the movement of which is conventionally controlled by a steering wheel 26 and a steering gear unit 28. The steering linkage 24 is operatively connected to the vehicle front wheels 30 to impart turning movement to the latter upon a corresponding driver initiated turning of the steering wheel 26. The steerable lamp assembly 20 is directly operatively coupled to the steering linkage 24 by a control linkage 32. Thus, for movement of the steering linkage 24 to the left, the wheels 30 will rotate in a counterclockwise direction to cause the vehicle 10 and the steerable lamp assembly 20 to turn toward the left. Conversely, movement of the steering linkage 24 to the right will cause a clockwise turning of the wheels 30 to cause the vehicle 10 and the steerable lamp assembly 20 to turn toward the right.

Figure 3:
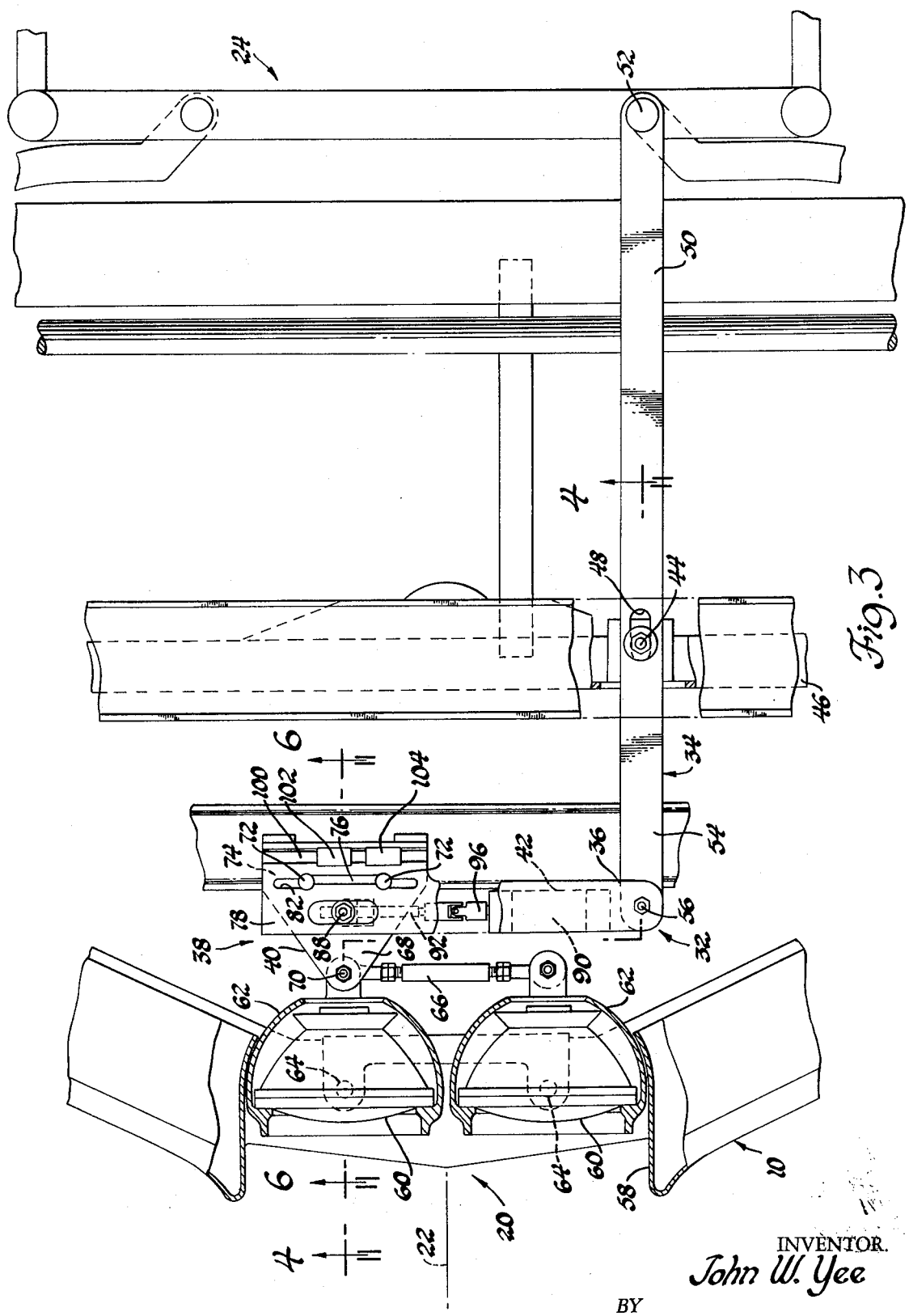
FIG. 3 is an enlarged partially sectioned view of the steerable lamp system.
Figure 4:
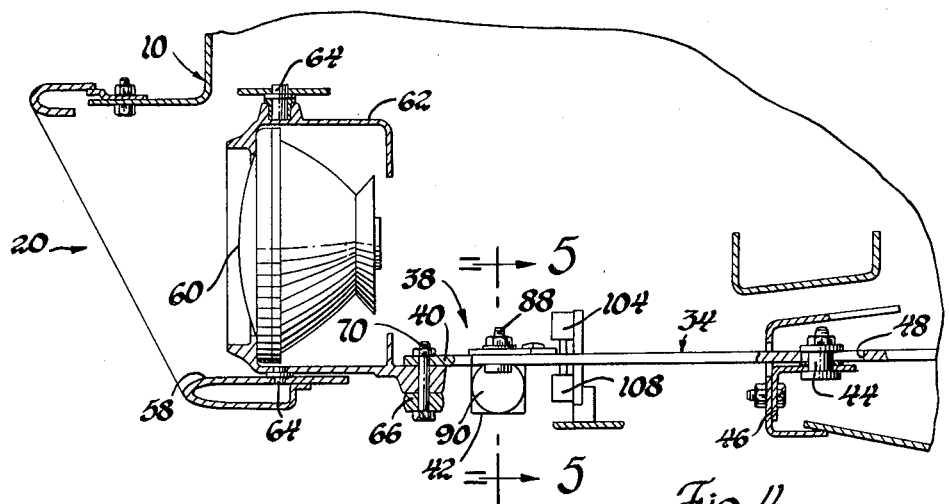
FIG. 4 is a view taken along line 4—4 of FIG. 3.

Referring to FIG. 3, the control linkage 32 comprises a drive arm 34, a connecting arm 36, and an extensible link 38 including a cam plate 40 and a linear actuator 42. The drive arm 34 is centrally pivotally connected to a pin 44 on a transverse vehicle frame member 46 at an elongated slot 48. The rear end 50 of the drive arm 34 is pivotally connected to the steering linkage 24 at a first pin connection 52. The forward end 54 of the drive arm 34 is pivotally connected to the right end of the connecting arm 36 at a second pin connection 56. With the arrangement thus far described, a left turning sequence of the vehicle or leftward motion of the steering linkage 24 will cause a clockwise pivoting of the drive arm 34 about the pin 44 and impart rightward motion to the connecting arm 36. A right turning sequence will cause a counterclockwise rotation of the drive arm 34 about the pin 44 and a leftward shifting of the connecting arm 36.

The steerable lamp assembly 20 is mounted within a central opening 58 of the motor vehicle 10 and includes a pair of driving lamps 60 symmetrically disposed on opposite sides of the vehicle axis 22. Each driving lamp 60 is mounted within a housing 62 which is supported for pivotal movement about a vertical axis by pivot connections 64. A tie rod 66 fixedly connected to the rear surfaces of each housing 62 provides for concurrent movement of the driving lamps 60 about the pivot connections 64.

Figure 5:
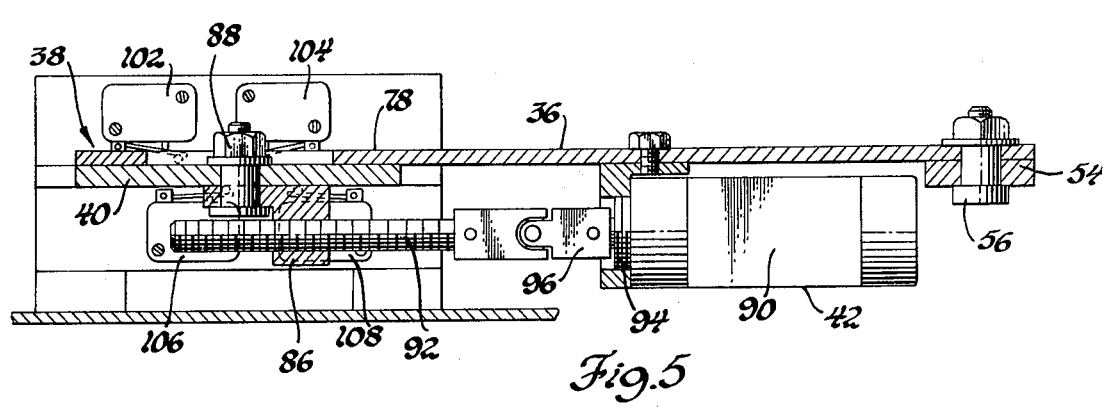
FIG. 5 is a view taken along line 5—5 of FIG. 4.
Figure 6:
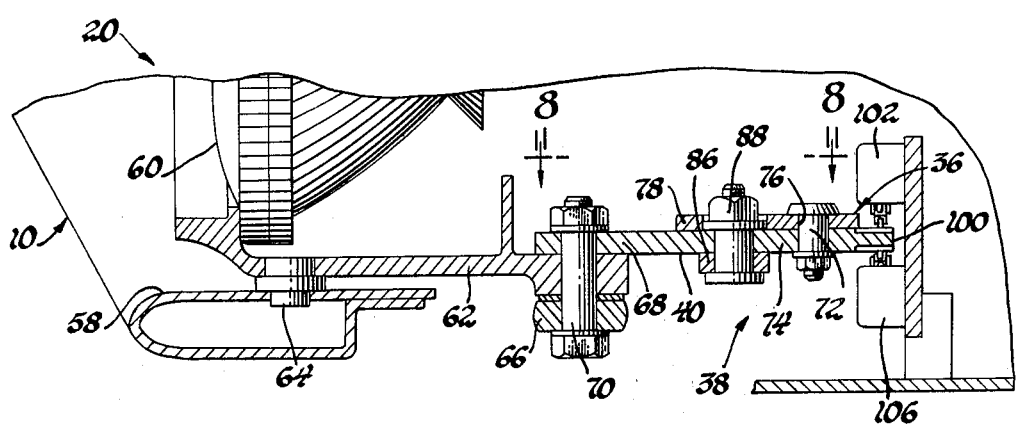
FIG. 6 is an enlarged view taken along line 6—6 of FIG. 3.
Figure 8:
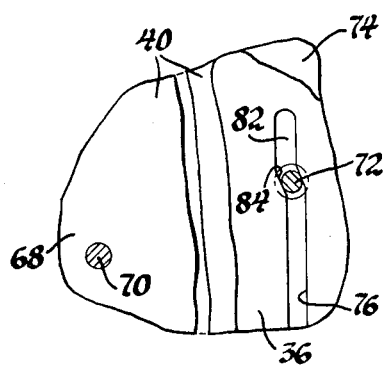
FIG. 8 is a view taken along line 8—8 of FIG. 6.

The extensible link 38, as shown in FIGS. 3 and 5, serves to rotate the driving lamps 60 independently of the steering linkage 24 and the drive arm 34 as controlled in a manner hereinafter described. More specifically, the triangular cam plate 40 is pivotally connected at its forward apex 68 to the tie rod 66 by a pin connection 70. As shown in FIGS. 6 and 8 a pair of spaced cam follower pins 72 are fixedly connected to the base 74 of the cam plate 40 and have shank portions slidably received in a camming slot 76 formed in the left end portion 78 of connecting arm 36. The camming slot 76 includes a central section 80 and laterally spaced end sections 82. The end sections 82 are spaced forwardly of the central section 80 and interconnected therewith by a pair of rearwardly converging ramp sections 84 which lie in a common arc having an origin at the pin connection 70.

The linear actuator 42, as shown in FIG. 5, includes an electric motor 90 fixedly mounted on the arm 36, an actuating nut 86 pivotally connected to the cam plate 40 by fastener 88, and an actuating screw 92 threaded through the actuating nut 86 and operatively connected to the output shaft 94 of the motor 90 by a universal joint 96.

With the extensible link 38 thus far described, energization of the motor 90 causes rotation of the actuating screw 92 so as to increase or decrease the length between the actuating nut 86 and the motor 90. This, in turn, will cause the follower pins 72 to shift along the ramp sections 84 and alternately into the central section 80 and an end section 82 of the camming slot 76. The shifting of the cam plate 40 will cause a lateral shift of the pin connection 70 thereby rotating the driving lamps 60 about the pivot connections. 64. However, during the travel within the confines of the ramp sections 84, no relative movement will take place inasmuch as the arc of the ramp has an origin at the pin connection 70. This, in effect, provides an operating range for starting and stopping the motor 90 without affecting the position of projecting light beams from the driving lamps 60.

Figure 7:
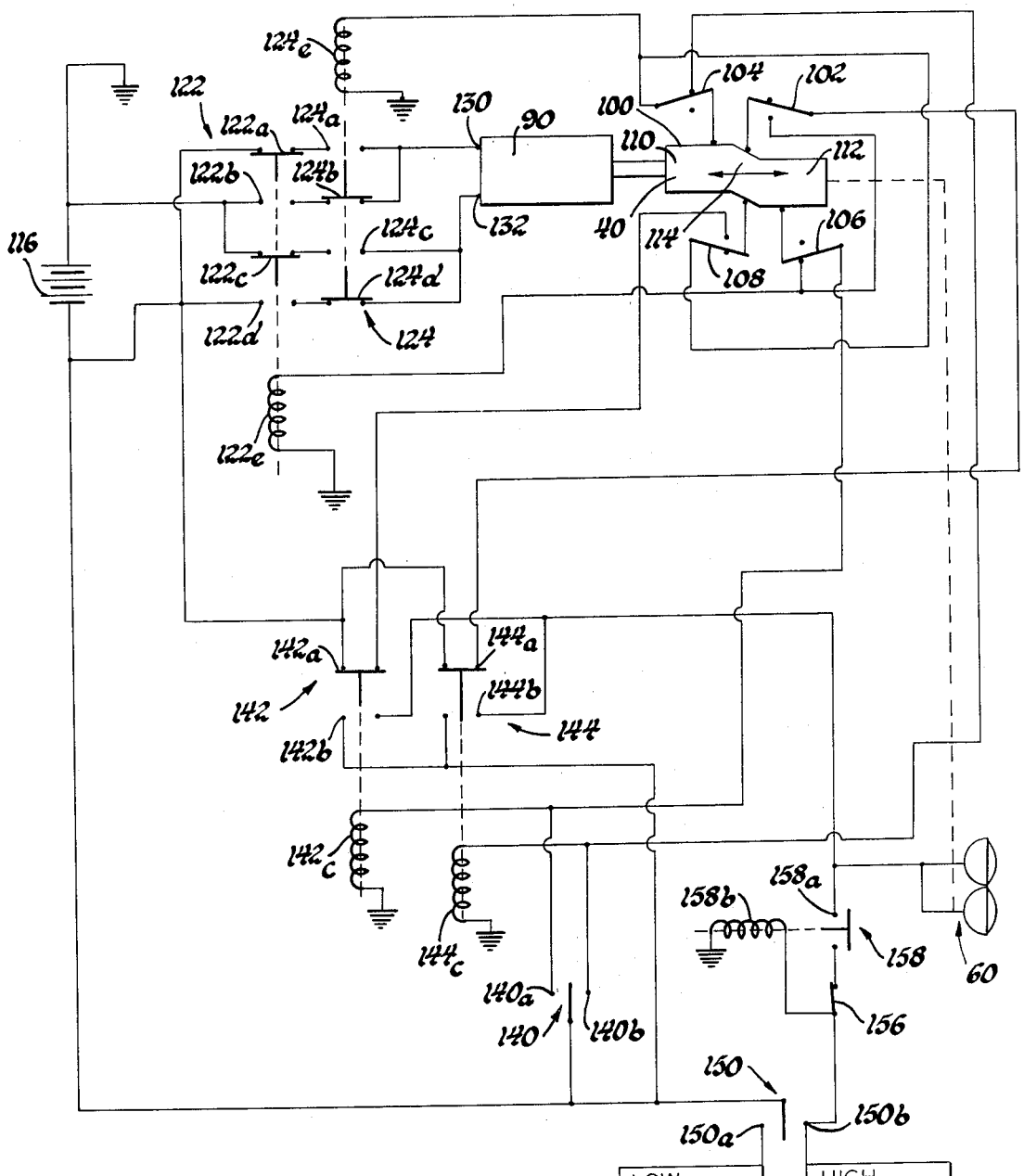
FIG. 7 is a schematic diagram of the control system for the steerable lamps.

Referring to FIGS. 5 and 6, the operation of the linear actuator 42 and positioning of the driving lamps 60 are regulated by a control system including a positioning cam 100 formed at the rear end of the base 74 and limit switches 102, 104, 106, and 108 which operatively engage the working surfaces of the cam 100. More specifically, and as shown schematically in FIG. 7, the cam 100 includes vertically spaced cam sections 110 and 112 which are interconnected by a camming ramp 114. In the illustrated neutral position, the contact arms of limit switches 102 and 108 engage the top and bottom surfaces of the camming ramp 114. The contact arm of the limit switch 104 engages the upper surface of the cam section 110. The contact arm of the limit switch 106 engages the lower surface of the cam section 112. The limit switches 102 and 108 are normally open switches, while the limit switches 104 and 106 are normally closed switches.

The control circuit for operatively positioning the steerable lamp system more particularly includes a power source 116, such as the vehicle battery, connected in series with the motor 90 through a pair of relay switches 122 and 124. The relay switch 122 includes normally closed contacts 122a and 122c and normally open contacts 122b and 122d with contacts 122b and 122c being connected to the positive side of the power source and contacts 122d being connected to the negative side of the power source. The relay switch 124 is connected in series with switch 122 and includes normally open contacts 124a and 124c and normally closed contacts 124b and 124d. Contacts 122a, 122b, 124a, 124b, are connected to positive terminal 130 of the motor 90. Contacts 122c, 122d, 124c, 124d are connected to the negative terminal 132 of the motor 90. With this arrangement, energization of the coil 122e for the relay switch 122 energizes the motor 90 for rotation of the output shaft 94 in one direction. Upon alternate energization of the coil 124e of the relay switch 124, the polarity to the motor windings is reversed thereby reversing the output shaft rotation of the motor 90.

The power source 116 is also connected with a turn signal switch 140 and a pair of relay switches 142 and 144. The switch 142 has normally closed contacts 142a, normally open contacts 142b, and a coil 142c which is connected to the left turn contact 140a, of the turn signal switch 140. The switch 144 includes normally closed contacts 144a, normally open contacts 144b, and a coil 144c which is connected to the right turn contact 140b of the turn signal switch 140. The contacts 142a and 144a are connected at one terminal to the contacts 122a and 122d, and at the other terminal, to the open contact of the switch 108 and the open contact of switch 102, respectively.

A foot operated dimmer switch 150 is connected with one terminal of the contacts 142b and 144b. The other terminals of the contacts 142b and 144b are connected to filaments of the lamps 60. The dimmer switch 150 is conventional in construction and in one position engages a low beam contact 150a to illuminate the low beam filaments 152 of the headlamps 12 and in the other position engages a high beam contact 150b to illuminate the high beam filaments 154 of the headlamps 12. A cut-off switch 156 provides operator control of the control circuit and is connected in series with a relay switch 158 to the lamps 60. The relay switch 158 includes normally open contacts 158a and a coil 158b which is connected to the high beam contact 150b. Further, the left turn contact 140a of the turn signal switch 140 and the coil 142c are connected to the closed contact of switch 106. The right turn contact 104b and the coil 144e are connected to the closed contact of the switch 104. The closed contact of switch 104 and the open contact of switch 108 are connected to the coil 124e of the switch 124. The closed contact of the switch 106 and the open contact of the switch 102 are connected to the coil 122e of the switch 122.

With the above-described control circuit, the driving lamps 60 will be illuminated when dimmer switch 150 is actuated to energize the high beam filaments 154 of the headlamps 12, or when the turn signal switch 140 is closed in contemplation of a left-hand or right-hand turning sequence. For example, actuating the dimmer switch 150 to illuminate the high beam filaments 154 will energize the coil 158b to close the contacts 158a thereby completing the circuit to the driving lamps 60 and energizing the latter. However, when the dimmer switch 150 is actuated to energize the low beam filaments of the headlamps, the circuit to the driving lamps 60 through the switches 142 or 144 remains open. If deemed desirable, the driving lamps 60 can be deenergized under high beam operation by opening the cut-off switch 156. The position of the projected beams from driving lamps 60 during high beam operation will, of course, be solely responsive to steering movement as controlled by the drive arm 34 and the connecting arm 36.

For operation of the steerable lamp assembly 20 during a contemplated left turn sequence, the turn signal switch 140 is closed against contact 140a thereby energizing the coil 142c and closing the contacts 142b so as to complete the circuit to the driving lamps 60. Concurrently, a circuit is completed through the switch 106 to energize the coil 122e and close the contacts 122b and 122d. The closing of the contacts 122b and 122d will then complete a circuit to the motor 90 thereby shifting the cam plate 40 to the right and pivoting the driving lamps 60 counterclockwise to illuminate an increased lateral field of view to the left of the vehicle in advance of the contemplated turn. The motor 90 will remain energized until the contact arm of the switch 106 engages the camming ramp 114 at which time the former will open to deenergize the coil 122e thereby interrupting the circuit to the motor windings.

After the preliminary pivoting, additional movement of the driving lamps 60 will be purely in response to steering movement. However, after completion of the turn and cancellation of the turn signal switch 140, the coil 142c is deenergized to extinguish the lamps 60. At this point, the switch 108 will be closed such that deenergization of the switch 142 will complete a circuit to and energize the coil 124e to close the switch 124. The closing of this switch will reverse the polarity of the motor windings and cause actuation of the cam plate 40 to the left. The motor 90 will remain energized until the lamps 60 have been automatically recentered at which time the switch 108 is opened upon engaging the camming ramp 114 thereby deenergizing the coil 124e of switch 124 to stop the motor 90.

For a contemplated right turning sequence, the turn signal switch 140 is shifted to the right to engage the contact 140b thereby energizing coil 144c and closing the contacts 144b so as to complete a circuit to the driving lamps 60. Concurrently, a circuit is completed through the switch 104 to energize the coil 124e and close the contacts 124a and 124c. The closing of these contacts completes a circuit to the reverse windings of the motor 90 which then actuates cam plate 40 to the left and pivots the driving lamps 60 clockwise to illuminate an increased lateral field of view on the right side of the vehicle prior to the contemplated turn. The motor 90 will remain energized until the contact arm of the switch 104 engages the camming ramp 114 at which time the former will open to deenergize the coil 124e thereby interrupting the circuit to the motor windings.

After the motor 90 is deenergized, subsequent movement of the driving lamps 60 is purely in response to steering movement. Thereafter, completion of the turn will cancel the turn signal switch 140 and deenergize the coil 144c thereby opening the switch 144 and extinguishing the driving lamps 60. At this point, the switch 102 will be closed and a circuit will be completed to energize the coil 122e. The closing of the switch 122 will reverse the motor 90 and cause actuation of the cam plate 40 to the right. As with the left turn sequence the motor 90 will remain energized until the lamps 60 are recentered at which time the switch 102 opens upon engaging the camming ramp 114 so as to deenergize the coil 122e and open the circuit to the motor 90.

Thus, at either position of the turn signal switch, the lamps will be automatically pivoted upon command in the direction of contemplated turn prior to initiation of the turning sequence. Thereafter, until cancellation of the turning switch the lamps will be positioned responsive to turning movement and, in this manner, provide increased lateral illumination in the direction of the turn. When the turn signal switch is cancelled, the above-described mechanism will automatically recenter the lamps and return control of the lamp position to the steering mechanism for movement in accordance with the vehicle travel.

Although only one form of this invention has been shown and described, other forms will be readily apparent to those skilled in the art. Therefore, it is not intended to limit the scope of this invention by the embodiment selected for the purpose of this disclosure, but only by the claims which follow.

What is claimed is:

1. A steerable lamp system for a motor vehicle having a turn signal system and a steering system, said steerable lamp system, comprising: a lamp unit mounted on said vehicle for pivotal movement about a vertical axis; a control linkage connected between said lamp unit and the steering system for causing said pivotal movement of the lamp unit in accordance with and in direct response to vehicle steering movement; extensible means operatively associated with control linkage for varying the effective length of said control linkage to thereby rotate said lamp unit independently of vehicle steering movement; motor means connected to said extensible means for causing said varying of the effective length; and control means between the motor means and the turn signal system for selectively energizing said motor means upon actuation of said turn signal system to change the effective length of said linkage and cause pivoting of the lamp unit in the direction of a contemplated turn, said control means including means for automatically deenergizing said motor means after predetermined pivotal movement and for automatically reversing said motor means to recenter the lamp unit after cancellation of the turn signal system thereby returning direct control of the lamp position to the steering system after completion of the turn.

2. In a motor vehicle having steering means and a turn signal system, a movable lamp system for projecting light in the direction of contemplated and actual turns of said vehicle comprising: lighting means movably mounted on the vehicle; means responsive to operation of said steering means for moving said lighting means to project light in the direction of and in accordance with an actual turn of the vehicle; and means associated with said lighting means and responsive to operation of the turn signal system for effecting preliminary movement of said lighting means in the direction of a contemplated turn of said vehicle in advance of said actual turn, said last-mentioned means being responsive to cessation of operation of the turn signal system for automatically recentering said lighting means after completion of said actual turn whereby the driver can command increased lateral illumination in the direction of turn in advance of the actual turning sequence of the vehicle.

3. A steerable lamp system for a motor vehicle having a turn signal system, a steering system and headlamps having high beam and low beam filaments, said steerable lamp system comprising: a driving lamp mounted on the vehicle for pivotal movement about a vertical axis; a control linkage operatively connected between said driving lamp and the steering system, said control linkage imparting pivotal movement to said driving lamp in accordance with and in direct response to steering movement of the vehicle; an extensible link in said control linkage for varying the effective length of said control linkage to bidirectionally rotate said driving lamp about said vertical axis independently of said steering movement; an electric motor connected to said extensible link for causing said varying of the effective length; a power source; first control means between said power source, said motor, the turn signal system, and the headlamps for energizing said motor when the turn signal system is activated and the high beam filaments are illuminated so as to vary said effective length of said extensible link and cause pivoting of said driving lamp in the direction of a contemplated turn; and second control means associated with the turn signal system and said extensible link for automatically deenergizing said electric motor after predetermined pivotal movement of said driving lamp and for reversing said motor to automatically recenter said driving lamp after cancellation of the turn signal system thereby returning direct control of the driving lamp position to the steering system after completion of the turn.

* * * * *